Dec. 12, 1939.  J. CUMMINGS  2,182,941
AUXILIARY BRAKE APPARATUS FOR SEMITRAILER VEHICLES
Filed Sept. 18, 1937  3 Sheets-Sheet 1

Inventor
JOHN CUMMINGS
By Robert Robb
Attorneys

Dec. 12, 1939.   J. CUMMINGS   2,182,941
AUXILIARY BRAKE APPARATUS FOR SEMITRAILER VEHICLES
Filed Sept. 18, 1937   3 Sheets-Sheet 2
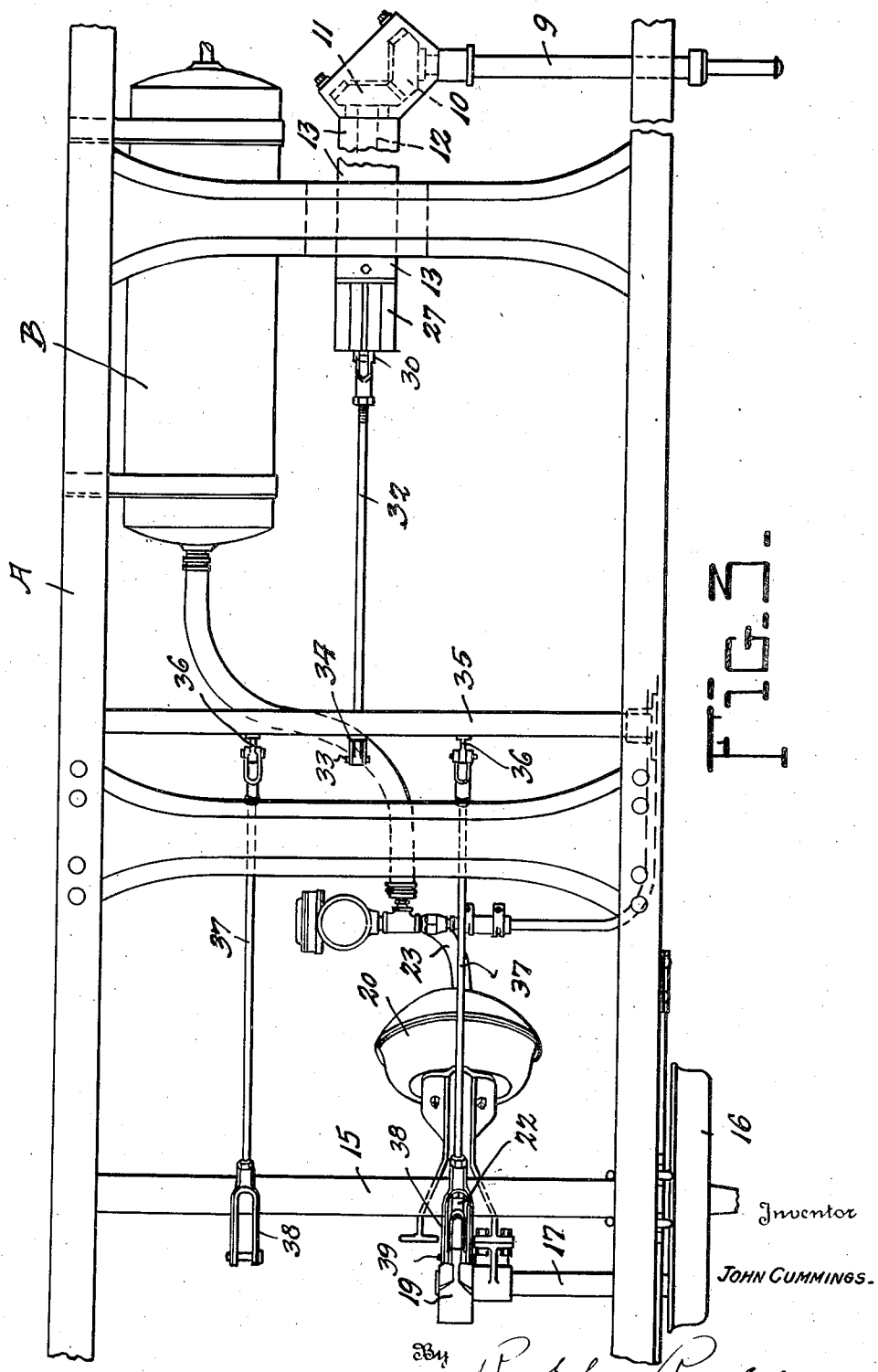
Fig. 2.
Inventor
JOHN CUMMINGS.
By 
Attorneys Dec. 12, 1939.                J. CUMMINGS                2,182,941
          AUXILIARY BRAKE APPARATUS FOR SEMITRAILER VEHICLES
                    Filed Sept. 18, 1937         3 Sheets-Sheet 3
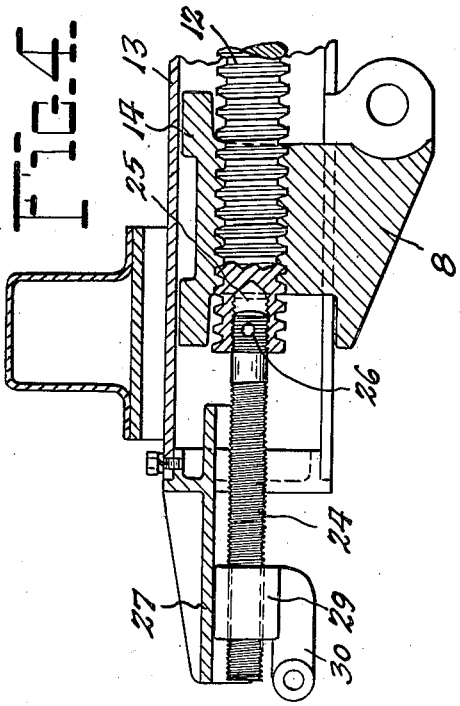
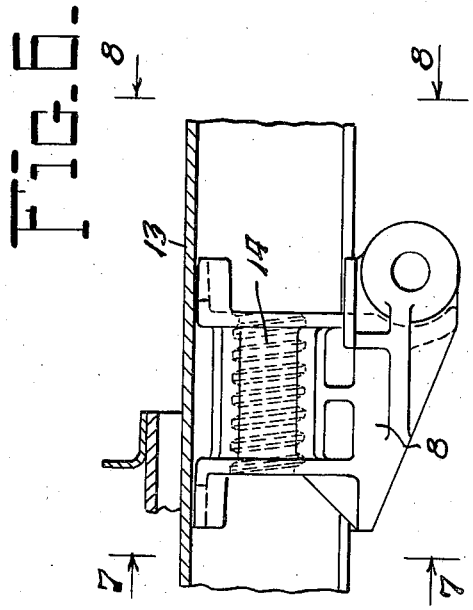
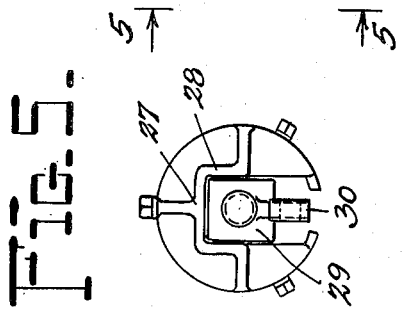
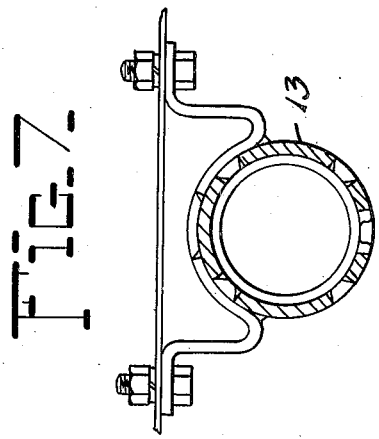
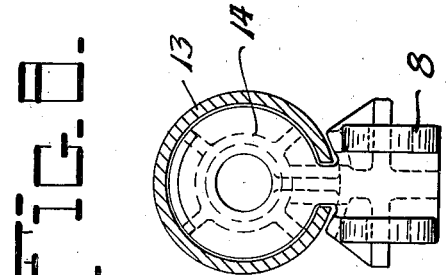
Inventor
JOHN CUMMINGS
By Robbs Robb
Attorneys Patented Dec. 12, 1939

2,182,941

UNITED STATES PATENT OFFICE 2,182,941

AUXILIARY BRAKE APPARATUS FOR SEMI-TRAILER VEHICLES

John Cummings, Edgerton, Wis., assignor to Highway Trailer Company, Edgerton, Wis., a corporation Application September 18, 1937, Serial No. 164,596

4 Claims. (Cl. 188—3)

The present invention appertains to brake systems of what are known commonly as semitrailer vehicles. A semitrailer is customarily capable of being coupled and uncoupled with respect to the traction or pulling vehicle, a fifth wheel being usually employed as the detachable connecting means. As is well known, when the trailer is uncoupled from the pulling vehicle, an adjustable front supporting unit consisting of a frame and small wheels is lowered in order to support the front end of the trailer, its rear end being mounted upon the usual rear travel wheels. After coupling the trailer, or upon coupling the same to the pulling vehicle, the front supports are raised so as to be out of the way while the pulling and trailer vehicles are traveling over the road.

This invention improves upon brake means of the type heretofore known to the art, by which, as the trailer front support is lowered to carry the weight of the front end of the trailer, the brake means associated with the rear travel wheels are set or applied. Thus, all the while the trailer is detached from its pulling vehicle, or parked, so to speak, the brakes of the trailer may remain applied, and the application of these brakes, according to the invention, is automatic incident to the lowering of said front support. When the front support is raised to its inoperative position for travel of the trailer, the auxiliary brake applying mechanism of the invention becomes effective to release the brakes of the trailer supporting wheels.

In carrying out the invention it is contemplated to employ auxiliary brake operating devices rotative with the common screw appliance that is employed to shift a slide block in order to raise and lower the said front support of the trailer.

The invention involves a simple arrangement of operating parts of the auxiliary brake applying means as compared with devices heretofore employed for the same purpose.

In the drawings:

Figure 2 is a view of that portion of the trailer which carries the front support, bringing out a little more clearly the operating means for said support.

Figure 3 is a fragmentary plan view of the brake features of the semitrailer, together with the associated auxiliary brake mechanism of the invention.

Figure 4 is a detail sectional view showing the main front support operating screw and certain cooperating parts and the supplemental screw connected therewith, by which to operate the auxiliary brake applying and releasing means.

Figure 5 is a rear elevational view of said parts, looking in the direction of the arrows 5—5 of Figure 4.

Figure 6 is a view showing in side elevation the slide block and its screw socket, which features are likewise shown in Figure 4 in longitudinal section.

Figure 7 is a sectional view taken about on the line 7—7 of Figure 6, looking in the direction of the arrows.

Figure 8 is an elevational view of the slide block and supporting guide means as viewed from the direction of the arrows 8—8 of Figure 6.

Figure 1:
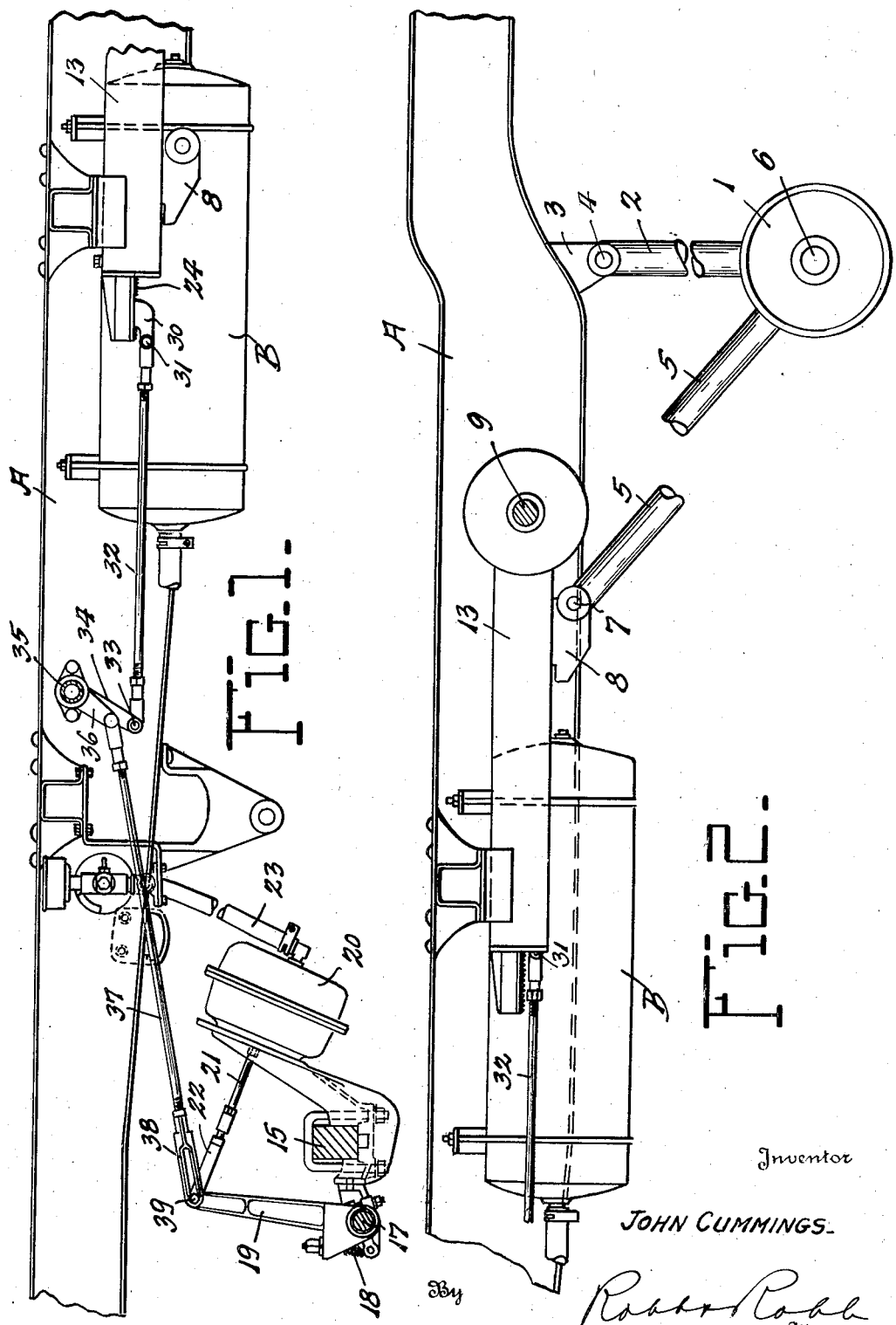
Figure 1 is a fragmentary sectional view of a portion of the chassis or frame of a semitrailer illustrating the general features of the mechanism of the invention applied thereto and used in conjunction with the ordinary brake mechanism of such trailers.

Referring particularly to Figures 1 to 3 inclusive, only portions of the semitrailer frame or chassis are illustrated, the same being designated at A and being of conventional construction. The front supports which carry the load of the front portion of the body of the trailer are seen in Figure 2 and comprise the small wheels 1 and the pivoted supporting legs 2 for said wheels. The legs 2 are pivoted to brackets 3 at the axis 4. Brace and operating rods 5 are connected to the wheel axle 6 at their lower ends and converge toward their upper ends where they are connected pivotally at 7 to the support actuator or slide block 8. Generally speaking, this front support construction is like that disclosed in United States Patent 1,997,095 of April 9, 1935, of Allen.

The raising and lowering movement of the supporting means 1—2 is effected by actuation of the connecting bars or rods 5 moved by the actuator 8 through the provision of a cross shaft 9 that operates a bevel gear 10, which bevel gear meshes with another bevel gear 11 carried by the actuating screw 12, see Figures 3 and 4. The screw 12 is disposed longitudinally, centralized within a casing 13, and said screw passes through the actuator 8, being received in a threaded socket 14 in said actuator. A crank or other implement may be applied to one end of the shaft 9 for turning same, thereby to rotate the screw 12 in either of opposite directions.

When the screw 12 is rotated in one direction, the actuator 8 is moved toward one end of the trailer vehicle chassis A, and this causes a lowering of the support members 1 and 2. Reverse movement of the screw 12 causes a raising of the support members 1 and 2 in an obvious manner, having in view the disclosure in the patent above identified.

Figures 1 and 3 illustrate the main brake means of the trailer vehicle as of a conventional type. In these figures the rear axle of the vehicle is designated 15 and carries the usual brake drums 16 with which coact brake bands operated by the cam shaft 17 normally acted upon by spring means 18 for holding the brakes released. Each shaft 17 is operated by a lever arm 19, in the customary manner. Any suitable main operating means for the brakes of the trailer may be employed, that shown being conventional as comprising the fluid motor 20 connected by a rod 21 and yoke 22 with the upper end of the lever arm 19.

A fluid pressure or vacuum line 23 leads to the fluid motor 20, which may be a fluid pressure piston type or vacuum type motor, and the said motor 20 is operated in the usual way under control of valve means adapted to be actuated from the seat of the driver of the pulling vehicle when the semitrailer vehicle is coupled thereto. There is illustrated the customary fluid or vacuum tank B used in brake systems of such semitrailer vehicles, but it is to be understood that the present invention is not limited to any special type of main brake mechanism, for several different types of such mechanism may be employed within the purview thereof.

Auxiliary brake mechanism

The auxiliary brake mechanism of the invention includes the supplemental screw 24, one end of which enters a socket 25 in the support actuating screw 12, said socket located at the rear end of the latter. The screw 24 is pinned, as at 26, to the screw 12, so as to be rotated therewith. Projecting rearwardly from the casing 13, in which the screw 12 is mounted to turn, is a bracket 27 having a rectangular guide portion 28 in which is mounted the auxiliary brake actuator 29 for free sliding movement. The actuator 29 has a threaded opening therethrough to receive the screw 24, and said actuator is also equipped with a pivot arm 30 pivotally connected at 31 with the actuating rod 32. At the end of the rod 32, opposite the pivotal connection 31, said rod is pivotally connected at 33 with a lever 34 carried by a cross shaft 35. The cross shaft 35 has two auxiliary brake actuating arms 36 rigidly connected therewith, and from each of the arms 36 extends a secondary auxiliary brake actuating rod 37. Each rod 37 is equipped at its rear end with a slotted yoke 38 that connects with the associated lever arm 19 at the upper pivot point 39 thereof. The yoke 22 is somewhat narrower than the yoke 38 so that the sides of the latter may engage the pivot 39 externally of the sides of the yoke 22.

Operation of main brake means

The main brake means is operated in the usual manner incident to the operation of the fluid motor 20, causing a forward movement of the lever arms 19 for the brake means 16. The forward movement of the arms 19 causes brake application, and a release of the brakes is obtained by the rear movement of the arms 19, in an obvious manner. When the brake arms 19 are actuated by the fluid motor means 20 to apply the brakes, each pivotal connection 39 between the arm 19 and its associated rod 37 floats freely forward in the slotted portion of the yoke 38 without affecting the auxiliary brake means in any way.

Operation of auxiliary brake means

We will assume that the pulling vehicle has hauled the semitrailer vehicle to a point where it is to be left at rest, as for instance backed up to a loading dock. The pulling vehicle then may be detached from the semitrailer vehicle, after the front support members 1 and 2 have been lowered to support the front end of the semitrailer. The lowering of the front support members 1 and 2 is effected by the operation of the screw 12 from the shaft 9, turned by a crank or otherwise. The turning of the screw 12 to effect the lowering support members 1 and 2 simultaneously rotates the screw 24. The threads of the screw 24 are much finer than the threads of the screw 12, so that the movement imparted by the screw 24 to the auxiliary brake actuator 29 will be relatively small as compared to the degree of movement of the support actuator 8. However, the movement of the auxiliary brake actuator 29 will be sufficient to carry the actuator forward enough to exert a pull upon the rods 32, lever arms 34 and 36, and rod 37 for each brake arm 19, and thereby shift the arm 19 forwardly enough to firmly apply the brakes 16 of the vehicle and the application of said brakes will be complete by the time the support members 1 and 2 are lowered to their positions of Figure 2.

Of course, when the auxiliary means above mentioned are operated in this manner, the rod 21 and yoke 22 of each lever arm 19 are moved forwardly and the fluid motor means 20 permits of such action.

After the trailer is loaded, and it is desired to couple the same to a pulling vehicle and haul it away, the pulling vehicle backs into the trailer fifth wheel and is coupled in the usual way by the fifth wheel. When the trailer is thus coupled to the pulling vehicle, before the hauling away is started, the operator turns the shaft 9 and raises the support members 1 and 2 to their inactive traveling position. This turning of the shaft 9 reverses its movement previously referred to as causing application of the auxiliary brake means, and thus effects a rearward movement of the auxiliary brake actuator 29 to thereby move the rods 32 and 37 rearwards for permitting release of the brakes 16 by the brake arms 19 and the spring means 18 associated therewith. The semitrailer is now ready to be moved away from its previous location by the traction or pulling vehicle.

It will be apparent from the foregoing that the operation of the auxiliary or parking brake means of the invention takes place incident to the actuation of the front support of the vehicle, causing application of the brakes when said support is lowered, and a release of the brakes when said support is raised. Moreover, the auxiliary brake actuating mechanism of the invention is attached to the conventional main brake mechanism and does not require any alteration or change in the construction of the latter according to conventional designs that may be used today.

Having thus described my invention, what I claim as new and desire to secure by Letters Patent of the United States, is:

1. In a semitrailer vehicle having a front support movable to a lowered position and elevatable to an inoperative traveling position, means for actuating said support to lower and raise the same, and main brake mechanism for the semitrailer vehicle, the combination of auxiliary brake applying means associated with said main brake mechanism for application and release of the latter, and comprising an auxiliary brake actuator connected to the main brake mechanism, and a rotative part operable by and simultaneously with the support actuating means, said auxiliary brake actuator having uniformly differential movement relative to the support actuating means responsive to operation of the rotative part aforesaid for causing gradual application of the main brake mechanism when the support is lowered and for releasing the main brake mechanism when the support is raised.

2. In a semitrailer having main brake mechanism for the travel wheels thereof, a front support adapted to be raised and lowered, and means for actuating said front support consisting of a screw, the combination of auxiliary brake operating mechanism comprising an auxiliary brake actuator connected to the main brake mechanism, and a screw attached to the screw for operating the said front support for causing movements of the auxiliary brake actuator in opposite directions to effect application and release of the main brake mechanism.

3. The combination of parts claimed in claim 2, wherein the screw attached to the front support operating screw is threaded more finely than the screw that cooperates with the front support, to thereby cause a relatively small amount of movement of the auxiliary brake actuator, combined with guide means for the auxiliary brake actuator.

4. The combination claimed in claim 2, wherein the screw coacting with the auxiliary brake actuator is attached at its front end to the rear end of the screw used for raising and lowering the front support, combined with guide means for the auxiliary brake actuator, said auxiliary brake actuator having a threaded socket to receive the screw coacting therewith, rod and lever arm connections leading from the auxiliary brake actuator to the main brake mechanism, one of said rod means including a slotted member, the slotted portion of which permits operation of the main brake mechanism without affecting the parts of the auxiliary brake mechanism.

JOHN CUMMINGS.